INVENTOR.
Thomas R. Baker

Nov. 15, 1966     T. R. BAKER     3,285,143
METHOD OF BONDING PANEL PORTIONS OF A FOLDING BOX
HAVING A COATING OF A THERMOPLASTIC MATERIAL
ON BOTH SURFACES
Filed Feb. 25, 1965                    2 Sheets-Sheet 2

INVENTOR.
Thomas R. Baker
BY Howard G. Russell
his ATTORNEY

United States Patent Office 3,285,143
Patented Nov. 15, 1966

3,285,143
METHOD OF BONDING PANEL PORTIONS OF A FOLDING BOX HAVING A COATING OF A THERMOPLASTIC MATERIAL ON BOTH SURFACES
Thomas R. Baker, Los Altos, Calif., assignor to Kliklok Corporation, New York, N.Y., a corporation of Delaware
Filed Feb. 25, 1965, Ser. No. 435,189
4 Claims. (Cl. 93—36)

This invention relates to the bonding by heat of panel portions of a folding box having a coating of thermoplastic material on both board surfaces.

For the packaging of frozen foods and other moisture or liquid containing products folding boxes are favored which are coated with a film of thermoplastic material on both surfaces. Such material may be a wax composition having a high melting point. Such wax compositions are presently offered by all major oil refining companies for this very purpose. The material may also be a synthetic thermoplastic such as polyethylene. The coatings may be treated to produce a high gloss finish on the board which enhances the appearance of any printing or lithographic art work thereon.

The caliper of the coatings according to a practice prevailing in the United States box industry may be defined in terms of weight of material per surface area unit. For example, a typical folding paper board is coated with seven pounds of wax per one thousand square feet of board (3180 grams per 92.9 square meters) of which amount four pounds are applied as an inside coating and three pounds as an outside coating.

The extreme thinness of the coating was previously considered inadequate for forming a reliable heat bond, for example, for sealing the box, and consequently an additional amount of adhesive had to be applied for the purpose of producing a bond, either by pre-application to the blanks or by application at the time of bonding.

Major difficulties are encountered in attempts to seal boxes without additional adhesive. Application of heat for the purpose of rendering the coating tacky generally causes the coating to become absorbed by the equally heated board leaving little, if any, coating material for the bond. Application of heat generally also causes the coating on the opposite side of the board to melt as a result of which a portion of the coating is transferred to elements provided for exerting sealing pressure on the panel to be adhered. This is doubly undesirable because the elements require periodic cleaning and because the box panels become unsightly from streaks formed across them. A method disclosed and claimed in a copending application Serial No. 435,281 filed February 25, 1965 by W. H. Hittenberger et al. solves the foregoing difficulties. The method is characterized by the application of heat to the surfaces to be bonded by a blast of extremely hot air having a temperature above the char point of the board. The char point lies in the neighborhood of 500 degrees F. (260° C.) and a typical air temperature employed in the method is 900 degrees F. (480° C.). It may be higher and range up to 1400 degrees F. depending on the rate of advance of the boxes which is extremely fast, typical linear rates being 18 to 32 inches per second (45 to 75 cm./sec.). Higher speeds may be employed if the production rate so demands.

The period of exposure to the air blast of the areas to be bonded is extremely short and is of the order of one tenth of a second.

The resulting application of heat is sufficient to melt the thermoplastic coating on the surface to which it is applied, but insufficient to permit any appreciable amount of heat to penetrate the board to the opposite surface to melt the coating thereon. In fact, the body of the board remains so cool that its low temperature may be utilized to dissipate the applied heat after the panels are brought into contact. The board acts as a heat sink, the heat simply disappears into it and the thermoplastic coating material solidifies with comparative rapidity.

The rate at which the panels are moved or folded into contact must of course be similarly rapid. Giving a typical example, six hundredths of a second are available for folding into flat contact two panels which are previously disposed in the shape of a V for hot air application. At such rapid rates the presence of atmospheric air must be taken into consideration as it interferes with the bonding.

It can readily be observed that if a sheet of plate glass of, for example, one square yard or one square meter size is stood upright upon another, but horizontal, sheet of glass and is then permitted to tip over onto the horizontal sheet, neither sheet is likely to be damaged. The air between the two sheets requires time to escape during the final phases of the fall. This cushions the falling sheet.

Similarly it was observed in practicing the method that the time for air to escape between panels of paperboard which are being folded into contact interferes with the formation of a bond in instances where the bond is to be at specific areas and where the panels are brought together within a very short period of time.

In general, the strength of an adhesive seal is gauged by the area within which board fibers are torn when the seal is forcibly opened.

The aforementioned method produces fully satisfactory results when only the area of torn fibers is taken as a gauge.

However there are many instances where a bond within a limited, yet predetermined, board area is preferred to a bond within larger board areas at uncertain and non-uniform locations. For example, in the sealing of tall boxes it is frequently required that the cover flap which is bonded to a box body wall must not only adhere at the lower corners and along the bottom center, but also adjacent the vertical flap edges at a height approximately midway between the bottom level and the top level of the box. This particular area prevents a bulged out appearance of the flap and closes a gap through which foreign substances could enter the space between the flap and the box wall.

The present invention represents an improvement of the aforementioned method. It provides for the raising by preembossing of certain surface areas at which a secure bond is to be effected with a high degree of uniformity. It is recognized that embossing of certain panel portions of a folding box is known per se. This expedient has been proposed for example for the purpose of providing open cuts or slits in a panel into which lock flaps are to be inserted with greater convenience than in a flat unembossed panel. Male locking elements have similarly been embossed. The known procedure however is quite unlike the present embossing in that problems with atmospheric air were neither encountered nor solved.

In the present case the embossed areas are brought into contact before all the air between the panels is expelled and at about the moment when the air cushion is becoming so thin as to require considerable time, comparatively speaking, for its complete removal. During that period the air film, however thin, prevents the board panels from coming into secure bonding contact rapidly and soon enough before the heated coating solidifies, after which, of course, a bond can no longer be formed.

Comparative tests have shown that the uniformity of the number of bonds obtained with embossed blanks considerably exceeds the uniformity of the number of bonds obtained with non-embossed blanks although the total bond area within which fibers are torn by opening is not necessarily greater in the case of embossed blanks.

These and other aspects, features and advantages of the invention will become more apparent from the detailed description which follows accompanied by drawings showing, for the purpose of illustration, a representative blank and a sealing procedure incorporating the present invention. The invention also resides in certain new and original steps and sequence of steps hereinafter set forth and claimed.

Although the characteristic features of this invention which are believed to be novel will be particularly pointed out in the claims appended hereto, the invention itself, its objects and advantages and the manner in which it may be carried out may be better understood by referring to the following description taken in connection with the accompanying drawings forming a part of it in which:

Figure 1:
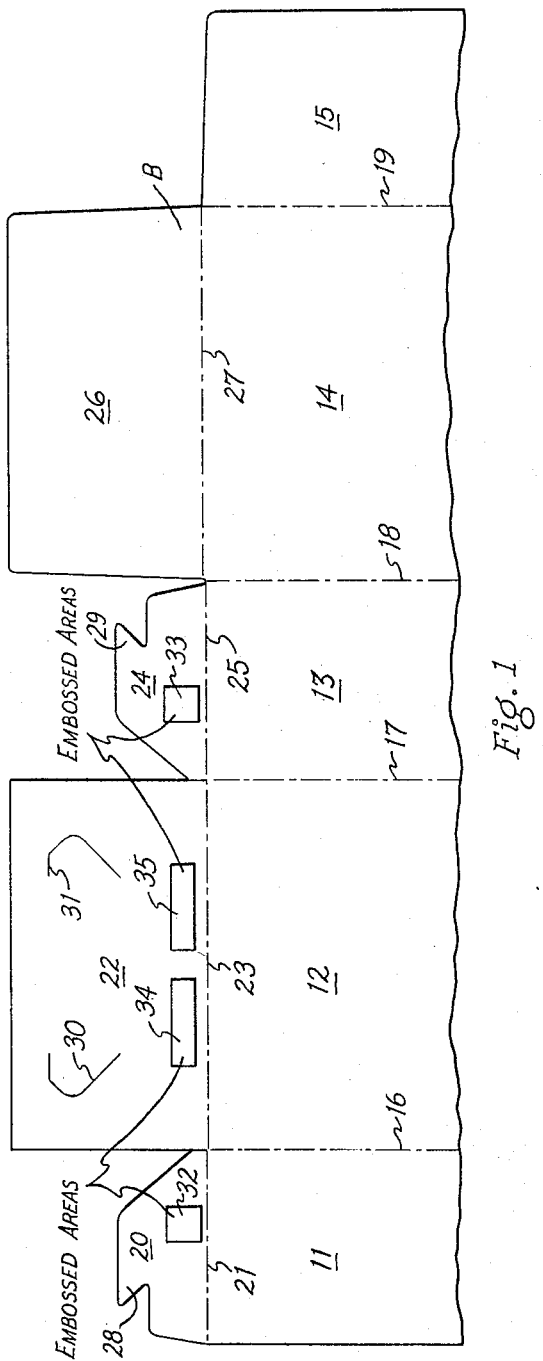
FIG. 1 is a plan view of one end portion of a folding box blank employed in this invention, it being understood that the other end is a mirror image of the illustrated end.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention, but it should be understood that structural details such as for example the location and shape of the embossing areas, may be modified in various aspects without departure from the principles of the invention and that the invention may be incorporated in other structural forms than shown.

Referring to FIG. 1, the blank B comprises a front wall panel 11, a bottom panel 12, a rear wall panel 13, a cover panel 14 and a cover front flap 15 articulated to one another along fold lines 16, 17, 18 and 19, respectively. To this series of panels a further series of panels is articulated, the latter series forming the end of the box. More particularly a corner flap 20 is articulated to the front panel 11 along a corner fold line 21, an end wall panel 22 is articulated to the bottom panel 12 along a bottom end fold line 23. A further corner flap 24 is articulated to the rear wall 13 along a corner fold line 25, and a cover side or end flap 26 is articulated to the cover panel 14 along a flap fold line 27.

The corner flaps have the usual lock tip configuration at 28, 29 and are insertable into internal locking cuts 30, 31 in the end wall panel with which they interlock.

A representative blank consisted of sulphite board and had a total thickness of 18 points (0.43 mm.) including two coating films of high melting point wax applied at a rate of 4 pounds to the inside of the board and 3 pounds to the outside of the board per 1000 square feet (metric equivalents were given above).

Embossed bonding areas 32, 33, 34, 35 are provided in the corner flap and in the end wall panel, respectively. A representative depth of embossing raises the embossed area by about the board thickness. For example a slide caliper placed across the embossed corner flap portion measured 0.9 mm. and 1.2 mm. when applied to the end wall portion.

The blank B is converted into box form B′ in the usual manner including interlocking of the corner assemblies. The box is then filled, for example with a frozen food product, and is finally subjected to the closing procedure disclosed in the aforementioned copending patent application.

Figure 2:
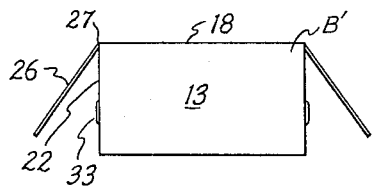
FIGS. 2 to 4 illustrate sequential steps in the performance of the sealing method.
Figure 3:
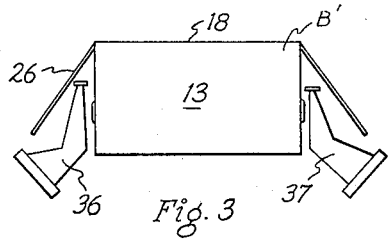
Figure 4:
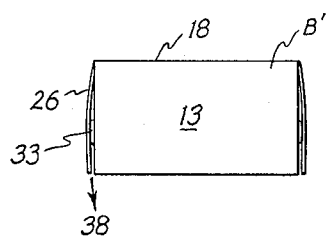
Figure 5:
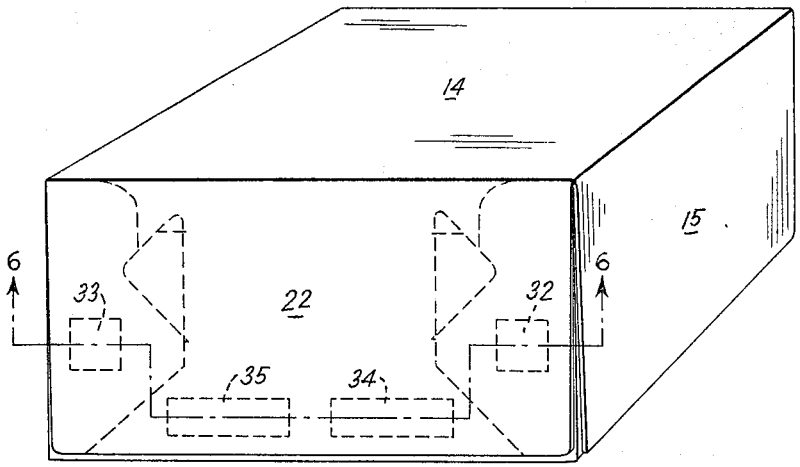
FIG. 5 is an isometric view of a closed box made from the blank of FIG. 1.
Figure 6:
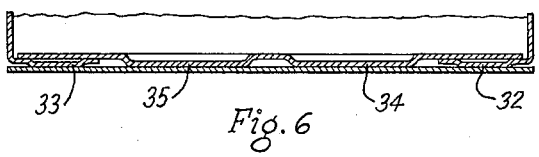
FIG. 6 is a section taken on line 6—6 of FIG. 5 showing somewhat exaggerated the bonding areas of the seal.

FIGS. 2 to 4 illustrate representative steps of the method. It may be assumed that the box B′ moves toward the observer with the cover hinge 18 leading. The cover flaps 26 are first folded into a downwardly slanted position forming an inverted V between the flap and the end wall (FIG. 2). The box B′ next passes hot air applicators which eject blasts of air laterally in a direction substantially normal to flaps and end walls (FIG. 3).

Immediately thereafter the flaps are swung into vertical position into contact with the end walls, more particularly with the embossed areas 32, 33, 34, 35 thereof. When bonding contact is made there still remains a gap through which air may escape, as indicated by arrow 38 (FIG. 4).

The steps represented in FIGS. 2 to 4 follow in extremely rapid sequence, the lapse of time between the operations represented in FIGS. 3 and 4 being of the order of a few hundredths of a second. Expressing this in terms of linear speed of a conveyor which moves the boxes at a continuous uniform rate past the stations of a machine at which the various operations are performed, the linear advance of the boxes is of the order of 18 to 32 inches per second (45 to 75 cc. per second) assuming an air temperature of 900 degrees F. (480° C.).

Higher rates may be achieved at somewhat higher air temperatures with equally satisfactory results. Higher speeds could not be maintained for long periods in tests because of a limitation of the box forming equipment.

*Example*

Comparative tests were run of embossed and non-embossed boxes. The boxes were then opened by forcibly tearing the flaps open to inspect the degree of uniformity at the respective areas which are considered critical at least for certain frozen food boxes. In the case of embossed boxes a uniform and satisfactory bond was obtained in 100 percent of the boxes. In the case of non-embossed boxes the following differences were noted: In about 40 percent of the boxes no secure bond was obtained between the cover flap and the underlying leading corner flap. Comparing further the 60 percent of the boxes in which a bond was produced between cover flap and the leading corner flap, the area within which fibers were torn was about one-half of the area of torn fibers of the embossed boxes. Considering the seal between the cover flap and the box end in general, the bond was firm and secure in one hundred percent of the non-embossed boxes, but with the distinction that 40 percent of these showed a gap due to the failure of producing a bond at approximately one-half of the height of the boxes. This gap is objectionable because it facilitates entry of foreign matter into the sealed box. No gap was found to exist in any of the embossed boxes.

What is claimed is:

1. In the method of bonding the cover flap panel of a hinge cover folding box of paperboard to a box body panel by means of a thermoplastic coating covering substantially all of the front and back surface of the board, the method involving the steps of (1) applying while the panels are separated, heat to both panels by a short blast of air at a temperature exceeding the char point of the board of a duration less than sufficient to melt the coating on the opposite side of the board by heat penetrating the board as a result of said blast followed by (2) moving the panels into bonding contact within a span of time from the last moment of exposure to hot air, shorter than the time of exposure of any one surface element to the hot air, the step of raising by pre-embossing at least one board area portion to which a bond is to be effected.

2. In the method of bonding the cover side flap of a hinge cover folding box of paperboard to the box body end wall which end wall comprises an end wall panel and corner flaps overlying the end wall panel and extending through slits therein, the bond to be formed by means of a thermoplastic coating covering substantially the entire front and back surface of the board, the method involving the steps of (1) applying while the flap and the end wall are separated heat to the flap and the end wall by a short blast of air of a temperature exceeding the char point of the board of a duration less than sufficient to melt the coating on the side opposite the one to which the blast is directly applied by heat penetrating the board as a result of said blast followed by (2) folding the flap over the end wall into bonding contact therewith and within a span of time from the last moment of exposure to hot air shorter than the exposure of any one surface element to the blast, the step of raising by preembossing at least one area portion of each corner flap to which portion a bond is to be effected.

3. The method claimed in claim 2 in which said area portions are at a height intermediate the bottom and the cover levels of the box.

4. In the method of bonding the cover side flap of a hinge cover folding box of paperboard to the box body end wall which end wall comprises an end wall panel and corner flaps overlying the end wall panel and extending through slits therein, the bond to be formed by means of a thermoplastic coating covering substantially the entire front and back surface of the board, the method involving the steps of (1) applying, while the flap and the end wall are separated, heat to the flap and the end wall by a short blast of air of a temperature exceeding the char point of the board of a duration less than sufficient to melt the coating on the side opposite the one to which the blast is directly applied by heat penetrating the board as a result of said blast followed by (2) folding the flap over the end wall into bonding contact therewith and within a span of time from the last moment of exposure to hot air shorter than the exposure of any one surface element to the blast, the step of raising by preembossing at least one area portion of the end wall panel between said corner flaps.

References Cited by the Examiner
UNITED STATES PATENTS

| 1,796,035 | 3/1931 | Maier | 229—35 |
| 3,018,701 | 1/1962 | Keely | 93—36 |
| 3,037,680 | 6/1962 | Hickin | 229—35 |
| 3,086,691 | 4/1963 | Fobiano | 229—35 |
| 3,107,586 | 10/1963 | Rogan | 93—36 |
| 3,148,599 | 9/1964 | Moore | 93—36 |

BERNARD STICKNEY, *Primary Examiner.*

JOSEPH R. LECLAIR, *Examiner.*

D. T. MOORHEAD, *Assistant Examiner.*